United States Patent [19]
Belgard

[11] 3,747,506
[45] July 24, 1973

[54] OVEN BROILER COOKING UTENSIL
[76] Inventor: Truly M. Belgard, 5645 E. Belknap, Fort Worth, Tex. 76117
[22] Filed: Dec. 30, 1971
[21] Appl. No.: 214,236

[52] U.S. Cl. .................................. 99/349, 99/425
[51] Int. Cl. ............................................ A47j 37/10
[58] Field of Search ..................... 99/349, 375, 400, 99/408, 422–423, 424–425, 426–427, 428, 444–445, 446–447, 448–449, 450; 220/44

[56] References Cited
UNITED STATES PATENTS

| 92,008 | 6/1869 | Browne .............................. 99/444 |
| 472,537 | 4/1892 | Griswold et al. ...................... 99/445 |
| 616,883 | 1/1899 | Bowers ............................ 220/44 A |
| 2,002,237 | 5/1935 | Roland ............................. 220/44 A |
| 2,080,171 | 5/1937 | Fairbanks et al. ............. 99/400 UX |
| 2,085,306 | 9/1939 | Fishel .................................. 99/349 |
| 3,010,383 | 11/1961 | Greene ............................ 99/375 X |

Primary Examiner—John Petrakes
Assistant Examiner—Arthur O. Henderson
Attorney—Harvey B. Jacobson et al.

[57] ABSTRACT

A container for broiling relatively flat pieces of meat in an oven. The container includes an upwardly convexed convex-concavo bottom wall and upstanding peripheral walls projecting upwardly from and extending about the periphery of the bottom wall. A cover is provided for the container and includes an upwardly convexed convex-concavo central portion bounded by a generally horizontal outer portion. The cover is receivable downwardly within the confines of the peripheral walls of the container and its concavo-convex portion is shaped to conform to and closely overlie the concavo-convex portion of the bottom wall of the container in surface-to-surface engagement therewith while the generally horizontal outer peripheral portion of the cover overlies, in vertically spaced relation thereto, a peripheral grease sump defined between the outer peripheral portions of the bottom wall and the upright peripheral walls of the container within the latter.

9 Claims, 5 Drawing Figures

PATENTED JUL 24 1973
3,747,506
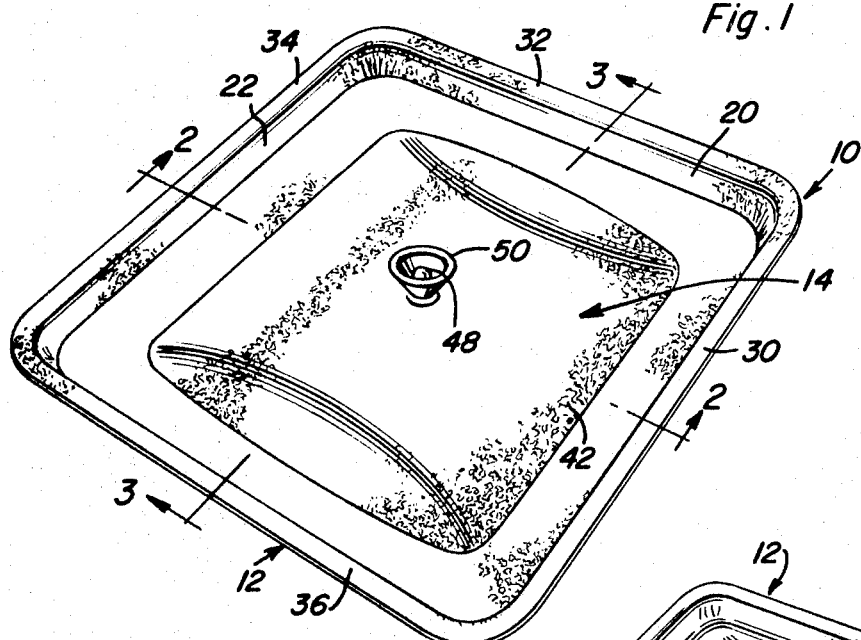
Fig. 1
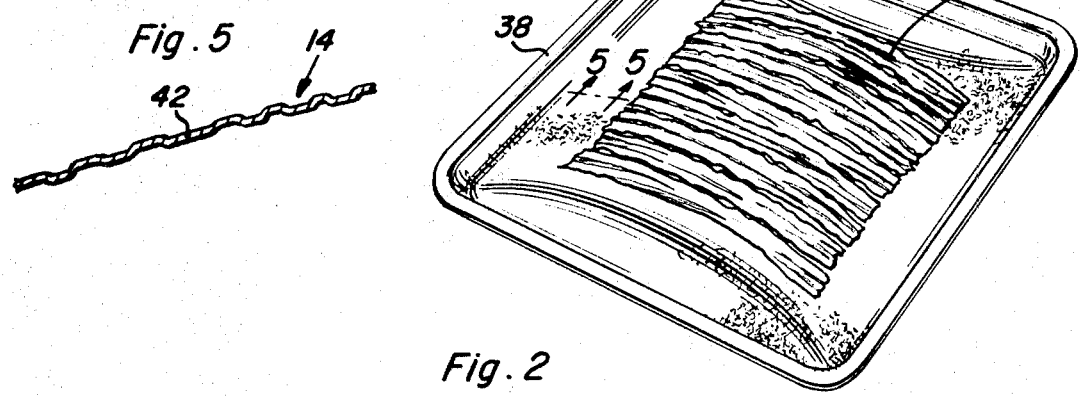
Fig. 4
Fig. 5
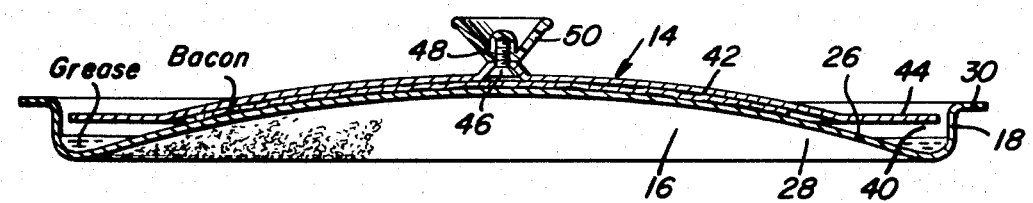
Fig. 2
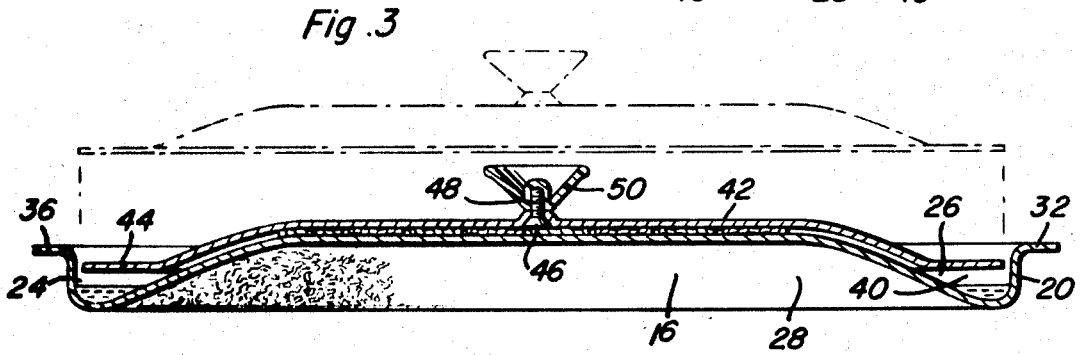
Fig. 3

OVEN BROILER COOKING UTENSIL

The oven broiler cooking utensil of the instant invention has been specifically designed to provide a means whereby relatively flat cuts of meat may be readily broiled within an oven and without grease from the meat splattering on any surfaces of the oven and yet with means being provided for draining grease away from the meat being broiled.

Although many devices have heretofore been designed for cooking meat in a manner whereby grease may be drained from the meat during the cooking process and other devices have been designed for cooking meat in a manner containing grease having a tendency to splatter, the prior art is devoid of a cooking utensil which will accomplish both these functions.

It is accordingly the main object of this invention to provide a cooking utensil in which meat may be broiled and which will serve to drain grease from the meat during the cooking process as well as contain the drained grease from splattering on adjacent areas.

It is another object of this invention to provide a cooking utensil in accordance with the preceding object and constructed in a manner whereby the contained grease will be substantially covered from exposure to either gas flames or hot electrical resistance heating elements within an oven and thereby function to reduce the possibility of a grease fire within the oven.

Yet another object of this invention is to provide a cooking utensil in accordance with the preceding objects and including structural features enabling the container and its cover to be readily manufactured by conventional methods at extremely low cost.

Another object of this invention is to provide a cooking utensil that may be readily stored and including a cover therefor which may be substantially completely stored within the container.

A final object of this invention to be specifically enumerated herein is to provide an oven broiler cooking utensil in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the cooking utensil of the instant invention;

FIG. 2 is an enlarged transverse vertical sectional view taken substantially upon the plane indicated by the section line 2—2 of FIG. 1 and with bacon strips to be broiled disposed within the utensil;

FIG. 3 is an enlarged transverse vertical sectional view taken substantially upon the plane indicated by the section line 3—3 of FIG. 1 and with a partially removed position of the cover of the utensil illustrated in phantom lines;

FIG. 4 is a perspective view of the utensil with its cover removed and with bacon strips positioned within the utensil; and FIG. 5 is an enlarged fragmentary transverse vertical sectional view taken substantially upon the plane indicated by the section line 5—5 of FIG. 4.

Referring now more specifically to the drawings the numeral 10 generally designates the cooking utensil of the instant invention which includes an upwardly opening container referred to in general by the reference numeral 12 and a generally horizontal cover referred to in general by the reference numeral 14.

The container 12 is generally rectangular in plan shape and includes an upwardly convexed convex-concavo bottom wall 16 and four said peripheral walls 18, 20, 22 and 24 which are carried by and project upwardly from the outer peripheral portions of the bottom wall 16.

The bottom wall 16 includes upper and lower surfaces 26 and 28, respectively, and the upper marginal edges of the peripheral walls 18, 20, 22 and 24 terminate upwardly in outwardly directed flanges 30, 32, 34 and 36 with adjacent ends of adjacent flanges joined together in order to form a continuous generally horizontal reinforcing flange 38 extending about the upper marginal edge portions of the upstanding peripheral walls 18, 20, 22 and 24.

It will be noted that the central portion of the bottom wall 16 is elevated above the horizontal plane containing the retaining flange 38 and that a peripheral grease sump 40 is defined between the adjacent portions of the outer periphery of the bottom wall 16 and the corresponding lower marginal portions of the peripheral walls 18, 20, 22 and 24.

The bottom wall 16, throughout at least the central portion thereof, is in the form of a partial cylindrical surface and thus is not partial spherical in configuration.

The cover 14 includes a central portion 42 which is similarly concavo-convex in shape and includes a generally horizontal outer peripheral grease retaining flange 44 extending thereabout. Further, the center of the central portion 42 of the cover 14 is apertured as at 46 and a threaded fastener 48 is secured through the aperture 46 in order to secure a heat resistant lifting knob 50 to the center of the cover 14.

From FIGS. 2 and 3 of the drawings it may be seen that the central portion 42 is shaped to conform to and overlie the center portion of the bottom wall 16 in surface to surface contacting engagement therewith when no strips of meat are interposed between the bottom wall 16 and the cover 14. However, as may be noted from FIGS. 2 through 4 of the drawings, a plurality of strips of meat such as bacon strips 52 may be placed upon the upper surface 26 of the bottom wall 16 and thereafter the cover 14 may be positioned as illustrated in FIGS. 1 through 3 of the drawings in order to clampingly secure, by the weight of the cover 14, the bacon strips 52 between the cover 14 and the bottom wall 16 with all portions of the strips 52 elevated above the grease sump 40. After the bacon strips 52 have been positioned on the bottom wall 16 and the cover 14 has been placed thereover with the grease retaining flange 44 of the cover 14 completely received within the confines of the peripheral walls 18, 20, 22 and 24, the utensil 10 may be placed in an oven which has been preheated to between 350° and 500° for a period of 10 to 25 minutes. After having been in a preheated oven for this length of time the bacon strips will be fully cooked, crisp and at least substantially straight without being curled and the grease driven from the meat by the cooking process will have been drained off into the grease sump 40.

In addition to broiling strips of bacon, the utensil 10 may be used to cook other foods such as sausage (either links or patties), ham, steaks, pork chops, cutlets, broiled fish steaks and fillets, etc. In each instance, the meat cooked within the container is substantially fully drained of the grease driven from the meat during the cooking process and meats having a tendency to curl while being cooked are prevented from curling.

Attention is again invited to FIG. 2 of the drawings wherein it will be seen that the grease retaining flange 44 is spaced appreciably above what would be considered the normal grease level within the grease sump 40 and that the grease within the sump 40 is substantially completely shielded from exposure to gas flames in a gas oven or highly heated electrical resistance heating elements in an electric oven and therefore that the utensil 10 substantially reduces the possibility of a grease fire in an oven when meat is being cooked.

The container 12 and cover 14 may be conveniently constructed of any suitable metallic sheet material such as aluminum. Both the container and the cover may be formed by stamping processes so as to reduce the cost of manufacture and the resultant utensil is therefore extremely light and yet durable. Further, if desired, the sheet material of which the container 12 and cover 14 are constructed may be embossed so as to reduce the tendency of meats to stick thereto and facilitate the drainage of grease in those areas of the opposing surfaces of the bottom wall 16 and the cover 14 contacted by the meat being cooked.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A container for broiling relatively flat pieces of meat in an oven, said container including a bottom wall and upstanding peripheral walls projecting upwardly from and extending about the periphery of said bottom wall, said bottom wall including an upwardly convexed central upper surface portion with the downwardly and outwardly inclined outer peripheral portions of said convexed central upper surface portion coacting with the adjacent peripheral walls of said container to define a grease sump surrounding at least the higher elevated portions of said central upper surface portion, and a cover for at least said higher elevated portions including a bottom surface having a central downwardly concave central areas conforming to the shape of and removably positioned in overlying relation to and supported from said higher elevated portions, said cover including an outer generally horizontal periphery received within the confines of said peripheral walls and substantially closing said sump from above with the outer marginal edges of said outer horizontal periphery spaced only slightly inwardly of the adjacent inner surface portions of said peripheral walls when saod cover is resting upon said higher elevated portions of said bottom wall upper surface portion.

2. The combination of claim 1 wherein said container and cover each are formed from a single sheet of material of substantially constant thickness.

3. The combination of claim 2 wherein said material comprises a metal having relatively good heat conducting properties.

4. The combination of claim 3 wherein the convexed upper surface portion of said bottom wall and the downwardly concave central area of said cover are embossed to facilitate the draining of grease from meat portions in contact with said embossed surfaces.

5. The combination of claim 1 wherein said container and cover are generally rectangular in plan shape.

6. The combination of claim 1 wherein said outer generally horizontal periphery of said cover is disposed below the upper marginal edge portions of said upright peripheral walls of said container when said cover is disposed within said container with its downwardly concave central area spaced only slightly above the convexed central upper surface portion of said bottom wall.

7. The combination of claim 6 wherein said container and cover each are formed from a single sheet of material of substantially constant thickness.

8. The combination of claim 7 wherein said material comprises a metal having relatively good heat conducting properties.

9. The combination of claim 8 wherein the convexed upper surface portion of said bottom wall and the downwardly concave central area of said cover are embossed to facilitate the draining of grease from meat portions in contact with said embossed surfaces.

* * * * *